United States Patent [19]

Ozawa et al.

[11] Patent Number: 5,265,788
[45] Date of Patent: Nov. 30, 1993

[54] BONDING MACHINE WITH OXIDIZATION PREVENTIVE MEANS

[75] Inventors: Kanji Ozawa; Yukitaki Sonoda, both of Tokyo, Japan

[73] Assignee: Kabushiki Kaisha Shinkawa, Tokyo, Japan

[21] Appl. No.: 797,801

[22] Filed: Nov. 21, 1991

[30] Foreign Application Priority Data

Nov. 21, 1990 [JP] Japan ................ 2-314430

[51] Int. Cl.$^5$ ................................. B23K 1/00
[52] U.S. Cl. ....................... 228/42; 228/219
[58] Field of Search ............ 228/240, 242, 219, 6.2, 228/42

[56] References Cited

U.S. PATENT DOCUMENTS

| | | | |
|---|---|---|---|
| 2,891,308 | 6/1959 | Lyons | 228/242 |
| 3,477,119 | 11/1969 | Smith | 228/242 |
| 4,205,221 | 5/1980 | Meyer | 228/242 |
| 4,564,135 | 1/1986 | Barresi et al. | 228/242 |

FOREIGN PATENT DOCUMENTS

| | | | |
|---|---|---|---|
| 46-10928 | 3/1971 | Japan | 228/219 |
| 46-10929 | 3/1971 | Japan | 228/219 |
| 53-10268 | 1/1978 | Japan . | |
| 57-190328 | 11/1982 | Japan . | |
| 0248570 | 10/1988 | Japan | 228/242 |

*Primary Examiner*—Mark Rosenbaum
*Assistant Examiner*—Chuck Y. Mah
*Attorney, Agent, or Firm*—Koda and Androlia

[57] ABSTRACT

A bonding machine with an oxidation preventive assembly that is made up of two pipes installed on the bonding stage. The two pipes are formed with gas discharge holes and their terminal ends are closed by a block to prevent a back-flow of the gas supplied into the pipes. Thus, a uniform gas atmosphere is created around the workpiece which is placed on the bonding stage, preventing oxidation of the workpiece.

2 Claims, 1 Drawing Sheet

BONDING MACHINE WITH OXIDIZATION PREVENTIVE MEANS

BACKGROUND OF THE INVENTION

1. Field of the Invention

The present invention relates to a bonding machine and more particularly to a bonding machine which includes a pipe system for preventing oxidation of workpieces placed on a bonding stage.

2. Prior Art

In prior art outer lead bonding, for example, as shown in FIG. 4, when leads 2, which are connected beforehand to electrodes of semiconductor device 1, are bonded to substrate 3, the substrate is first set on a bonding stage 5, and then a semiconductor device 1 that has the leads 2 is placed on the substrate. Bonding tool 8 is lowered and presses down the leads 2 onto the substrate 3, thus performing the bonding. The bonding stage 5 includes heat block 6, which contains a heater, and a hot plate 7.

However, if the workpiece 4, which comprises the semiconductor device 1, the leads 2 and the substrate 3, is entirely or partially made of a material such as copper, it can easily be oxidized when it is heated by the bonding stage 5. In order to prevent oxidation, a reducing gas or an inert gas (hereinafter collectively called "gas") is blown out of nozzle 9 to the workpiece 4.

The Japanese Patent Application Laid-Open (Kokai) No. 53-10268 is a prior art which discloses a bonding machine wherein gas is blown out of a nozzle to a workpiece.

The prior art device shown in the accompanying FIG. 4, however, has problems. Since the gas is blown onto the workpiece 4 from only one side that faces the nozzle 9, the gas cannot reach the other side. In other words, a uniform gas atmosphere which covers the entire surface of the workpiece cannot be created around the workpiece, resulting in poor oxidation prevention.

The device disclosed in the Japanese Patent Application Laid-Open (Kokai) No. 57-190328, for example, solves the problem. In this prior art, a blow pipe having gas discharge holes that are opened to face workpiece is provided around the bonding stage so that the pipe surrounds the entire workpiece and discharges the gas onto the workpiece. Thus, since the blow pipe surrounds the entire workpiece, a uniform gas atmosphere can be created around the workpiece.

However, even the piping system of this prior art has problems. Since the gas route is formed continuous, the gas supplied into the blow pipe tends to flow backward. If the back-flow occurs, a pressure difference results at the supply end and terminal ends of the blow pipe, which causes a non-uniform gas atmosphere around the workpiece.

SUMMARY OF THE INVENTION

Accordingly, the object of the present invention is to provide a bonding machine that avoids back-flow of the gas supplied into blow pipe, thus preventing oxidization of the workpiece upon which bonding is performed.

To accomplish the object, the present invention employs two blow pipes which are installed above the bonding stage. More specifically, in a bonding machine that includes a bonding stage so that workpieces are placed and bonded thereon, two blow pipes provided with several gas discharge holes are utilized for releasing heated gas. One blow pipe is closed at its terminal end and arranged so as to surround approximately half of the workpiece placed on the bonding stage, and the other blow pipe, that is also closed at the terminal end, is arranged so as to surround approximately the remaining half of the workpiece.

As a result, the entire workpiece is surrounded by the two blow pipes which are both closed at terminal ends; therefore, no back-flow of the gas supplied into the blow pipes occurs, thus creating a uniform gas atmosphere around the workpiece and preventing oxidization of the workpiece.

DETAILED DESCRIPTION OF THE INVENTION

Figure 1:
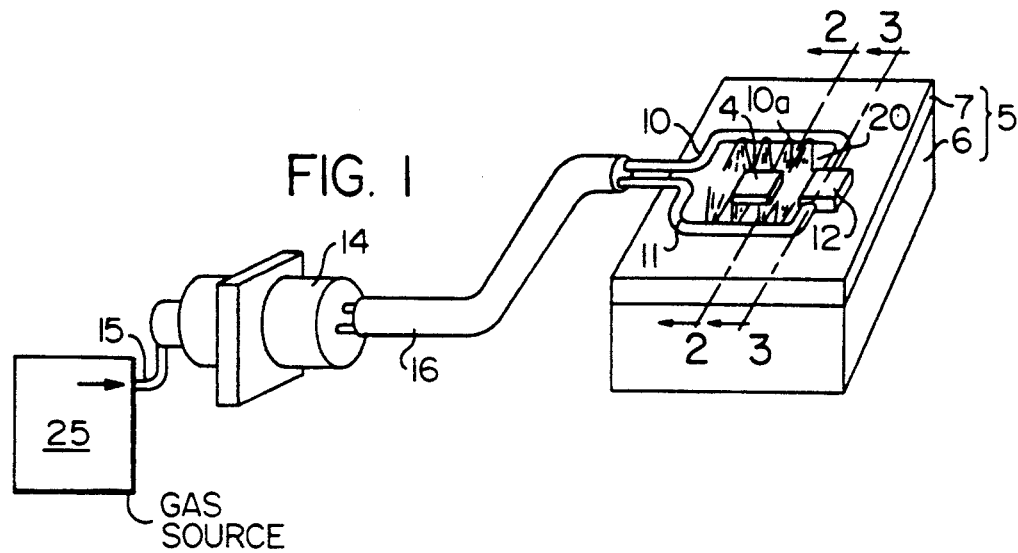
FIG. 1 is a perspective view showing one embodiment of the present invention.
Figure 2:
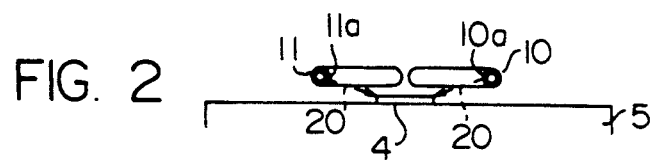
FIG. 2 is a cross-section taken along line 2—2 of FIG. 1.
Figure 3:
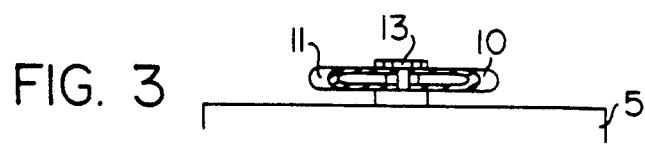
FIG. 3 is a cross-section taken along line 3—3 of FIG. 1.
Figure 4:
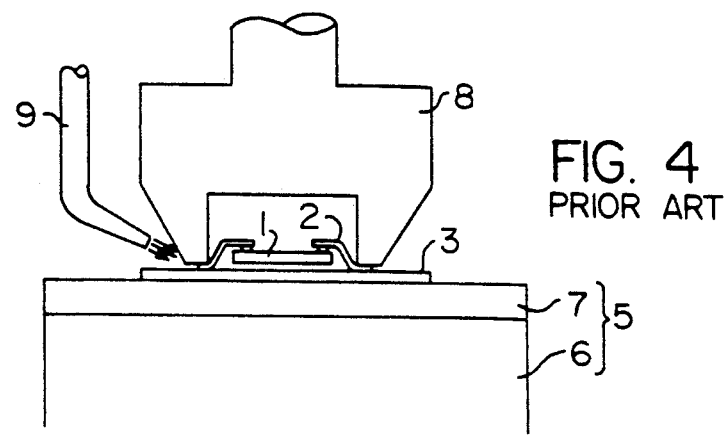
FIG. 4 is a front view of an example of a prior art bonding stage.

In FIG. 1, bonding stage 5 is provided with two blow pipes 10 and 11 on the top surface. The bonding stage 5 is comprised of heat block 6 and hot plate 7. The blow pipes 10 and 11 are shaped so that they surround workpiece 4 that is placed on the stage 5. Terminal ends of the blow pipes are secured to the stage 5 by pipe holder 12.

More specifically, the blow pipe 10 is shaped so that it surrounds approximately half of the workpiece 4, and the other blow pipe 11 is shaped so that it surrounds the other half of the workpiece 4. In addition, a plurality of gas discharge holes 10a and 11a are opened in inwardly-facing walls of the blow pipe 10 and blow pipe 11, respectively. Terminal ends of the blow pipes 10 and 11 are closed by block 13, and the other ends of the blow pipes 10 and 11 are connected to the outlet of heater 14.

Gas supply pipe 15 is connected to the gas entrance of the heater 14 so that gas is supplied to the heater 14 from a gas supply or a gas source 25 via the pipe 15. The pipes 10 and 11 are covered with thermal insulation layer 16 between the heater 14 and the bonding stage 5.

In the thus arranged piping system, the gas transferred via the pipe 15 is heated by the heater 14, supplied to the blow pipes 10 and 11 and discharged from the discharge holes 10a and 11a. Since the terminal ends of the blow pipes 10 and 11 are closed by block 13, the gas is discharged from the gas discharge holes 10a and 11a onto the workpiece 4 without creating any back-flow.

In addition, since the gas 20 is discharged from the gas discharge holes 10a and 11a onto the workpiece 4 from both sides of the workpiece 4, the gas atmosphere created around the workpiece 4 is stable, and the gas can evenly cover the entire bonding surface of the workpiece 4. Consequently, oxidation of the workpiece 4 is prevented effectively. Also, since the terminal ends of the blow pipes 10 and 11 are closed by the block 13, no back-flow of the gas in the blow pipes 10 and 11 occurs.

In the present invention, the gas is heated by the heater 14 and then blown onto the workpiece 4. Accordingly, the workpiece 4 is not cooled and kept warm, thus preventing any detrimental effect on the bonding. Also, since the blow pipes 10 and 11 are covered with thermal insulation layer 16, the gas heated by the heater 14 is discharged from the gas discharge holes 10a and 11a without dropping the temperature.

As described above, according to the present invention, the workpiece on the bonding stage is kept heated by a heating element provided in the bonding stage, and a heated gas is released from two pipes and blown onto the workpiece. Each of the two pipes is closed at the end and arranged to surround half of the workpiece respectively, thus cooperatively surrounding the entire workpiece. Accordingly, the gas supplied into the blow pipes is prevented from flowing backwards in the pipes and blown out onto the workpiece evenly, thus preventing oxidization of the workpiece.

We claim:

1. An oxidation preventive means for a semiconductor bonding machine with a bonding stage on which semiconductors are placed, said oxidation preventing means comprising:

a source of oxidation preventive gas;

a heater means coupled to said source;

a first pipe coupled to said heater means and extending to and surrounding one-half of said bonding stage;

a second pipe coupled to said heater means and extending to and surrounding one-half of said bonding stage and opposing said first pipe;

a closing block provided between and closing opposing terminal ends of the portions of said first and second pipes which surround one-half of said bonding stage;

a plurality of gas discharge holes provided in only said portion of both said first and second pipes which surround said bonding stage; and a thermal insulation means provided on a remainder of said first and second pipes.

2. An oxidation preventive means for a semiconductor bonding machine according to claim 1 wherein said oxidation preventive gas comprises inert or reducing gas.

* * * * *

UNITED STATES PATENT AND TRADEMARK OFFICE
CERTIFICATE OF CORRECTION

PATENT NO.  : 5,265,788
DATED       : November 30, 1993
INVENTOR(S) : Kanji Ozawa et al.

It is certified that error appears in the above-identified patent and that said Letters Patent is hereby corrected as shown below:

On the Title Page:

Item [75] Inventors: Change "Kanji Ozawa; Yukitaki Sonoda, both of Tokyo, Japan" to --Kanji Ozawa; Yukitaka Sonoda, both of Tokyo, Japan--

Signed and Sealed this

Nineteenth Day of April, 1994

Attest:

BRUCE LEHMAN

Attesting Officer

Commissioner of Patents and Trademarks